US 8,588,948 B2

(12) United States Patent
Lee et al.

(10) Patent No.: US 8,588,948 B2
(45) Date of Patent: Nov. 19, 2013

(54) AUDIO ENABLED CONTROL MENU SYSTEM, METHOD AND DEVICE

(76) Inventors: Houghton Lee, Hong Kong (HK); Gary Sargeant, Greenhills (AU)

( * ) Notice: Subject to any disclaimer, the term of this patent is extended or adjusted under 35 U.S.C. 154(b) by 822 days.

(21) Appl. No.: 12/764,962

(22) Filed: Apr. 22, 2010

(65) Prior Publication Data

US 2010/0292990 A1 Nov. 18, 2010

(30) Foreign Application Priority Data

May 12, 2009 (CN) ...................... 2009 2 0056372 U

(51) Int. Cl.
*G06F 17/00* (2006.01)
*G06F 3/16* (2006.01)
*G05B 19/02* (2006.01)
*G05B 11/01* (2006.01)

(52) U.S. Cl.
USPC .............. 700/94; 381/74; 715/727; 340/4.37; 700/17

(58) Field of Classification Search
CPC . G06F 1/1684; G06F 1/1688; G06F 17/3005; G06F 17/30017; G06F 17/30056
USPC ......... 340/4.37; 361/679.03; 381/74; 700/17, 700/23, 83, 94, 301, 302; 715/727
See application file for complete search history.

(56) References Cited

U.S. PATENT DOCUMENTS

| 2005/0015254 A1* | 1/2005 | Beaman ...................... 704/270.1 |
| 2006/0095848 A1* | 5/2006 | Naik .............................. 715/727 |
| 2007/0184881 A1* | 8/2007 | Wahl et al. ................. 455/575.2 |
| 2009/0252311 A1* | 10/2009 | Kuiken .................... 379/102.02 |
| 2012/0136667 A1* | 5/2012 | Emerick et al. ............... 704/275 |

* cited by examiner

*Primary Examiner* — Jesse Elbin
(74) *Attorney, Agent, or Firm* — Eagle IP Limited; Jacqueline C. Lui

(57) ABSTRACT

An audio enabled control menu system, method and device is provided. Embodiments of the present invention include an encoder including an input device actuation of the encoder by an operator of the control menu device; memory including a menu structure and a plurality of audio segments stored in the memory; and a microcontroller in operable communication with the encoder and the memory, the microcontroller further configured to receive menu navigation input from the encoder and output one of the plurality of audio segments in response to the menu navigation input, the microcontroller further configured to execute predetermined control actions in response to the menu navigation input. Embodiments of the invention transmit menu options to an operator in an audio format such that the operator can browse and select menu options with one hand and does not need to look at a visually displayed menu.

8 Claims, 4 Drawing Sheets

AUDIO ENABLED CONTROL MENU SYSTEM, METHOD AND DEVICE

FIELD OF THE INVENTION

The invention relates to menu selection systems, and more particularly to an audio enabled control menu system, method and device.

BACKGROUND OF THE INVENTION

In many situations, only one hand is available to make control selections. For example, workers in the factory make control selections with only one hand while operating the machine, and so do the drivers of cars while driving a vehicle or pilots while operating an aircraft. In one particular example, a pilot in the popular micro-light aircraft, accommodating only one pilot, has to manipulate the control stick with one hand and operate the communications system with the other hand in order to choose to talk to the ground station or air traffic control, or other pilots in the air. In this case, the pilot cannot stare at the menu of the control panel for safety reasons. However, without using your eyes, it is difficult to operate the complicated keyboard of the control panel in order to make the corresponding communications system choice. It can be seen from these examples that it can be hard to make control selections using one hand without using your eyes. Control selection could similarly be difficult for the blind or visually impaired.

Accordingly, there is a need for an audio enabled control menu system and device that addresses these needs and the shortcomings of known menu systems.

SUMMARY OF THE INVENTION

According to one embodiment of the present invention, an audio enabled control menu device is disclosed. The audio enabled control menu device includes an encoder including an input device for actuation of the encoder by an operator of the control menu device; memory including a menu structure and a plurality of audio segments stored in the memory; a microcontroller in operable communication with the encoder and the memory, the microcontroller further configured to receive menu navigation input from the encoder and output one of the plurality of audio segments in response to the menu navigation input, the microcontroller further configured to execute predetermined control actions in response to the menu navigation input.

According to another embodiment of the present invention, an audio enabled control menu device is disclosed. The audio enabled control menu device includes an encoder including an input device for actuation by an operator of the control menu device, the coupled to the encoder, wherein the encoder is configured to register actuation of the input device; memory including a menu structure stored in the memory and audio data stored in the memory, the menu structure including a predetermined decision tree including a plurality of options, and the audio data including a plurality of audio segments, and wherein the plurality of audio segments are associated with the plurality of options such that each of the plurality of options has an associated one of the plurality of audio segments; an output device configured to output the plurality audio voice segments to the user; and a microcontroller in operable communication with the encoder and the memory, the microcontroller further configured to receive menu navigation input from the encoder, the menu navigation input including a select input, a browse input, and a back input, the microcontroller further configured to navigate the menu structure in response to the menu navigation input, the microcontroller further configured to output the associated one of the plurality of audio segments in response to the menu navigation input.

According to one embodiment of the present invention, a communications headset with audio enabled control menu selection is disclosed. The communications headset includes one or more headset earpieces; a rotary encoder disposed within the one or more headset earpieces, the rotary encoder including a knob for actuation of the rotary encoder by a wearer of the communications headset; memory disposed in the one or more headset earpieces, the memory including a menu structure and a plurality of audio segments stored in the memory; and a microcontroller disposed in the one or more headset earpieces, the microcontroller in operable communication with the rotary encoder and the memory, the microcontroller further configured to receive menu navigation input from the rotary encoder and output one of the plurality of audio segments in response to the menu navigation input, the microcontroller further configured to execute predetermined control actions in response to the menu navigation input.

According to one embodiment, a method for operating an audio enabled control menu is disclosed. The method includes storing a menu structure in memory, wherein the menu structure includes a plurality of menu options; storing a plurality of audio segments in memory, wherein the plurality of audio segments are associated with the plurality of options such that each of the plurality of options has an associated one of the plurality of audio segments; receiving a navigation input from the user; navigating the menu structure according to the navigation input; outputting the associated one of the plurality of audio voice segments associated with a location in the menu structure.

Still other embodiments of the present invention will become readily apparent to those skilled in the art from the following detailed description, wherein embodiments of the invention are described by way of illustration. As will be realized, the invention is capable of other and different embodiments and its several details are capable of modifications in various respects, all without departing from the spirit and the scope of the present invention.

DETAILED DESCRIPTION

In the following description, reference is made to the accompanying drawings where, by way of illustration, specific embodiments of the invention are shown. It is to be understood that other embodiments may be used as structural and other changes may be made without departing from the scope of the present invention. Also, the various embodiments and aspects from each of the various embodiments may be used in any suitable combinations. Accordingly, the drawings and detailed description are to be regarded as illustrative in nature and not as restrictive. Like elements in each of the figures are referred to by like reference numbering.

Generally, embodiments of the present invention are directed to an audio enabled control menu system and device. Embodiments of the invention transmit menu options to an operator in an audio format such that the operator does not need to look at a visually displayed menu. The operator may navigate through different menu options using one hand by performing select and browse functions with a knob included on a communications headset. At least some of the menu options are associated with predetermined actions such that selection of one of the menu options issues a control signal to perform the associated, predetermined action.

Figure 1:
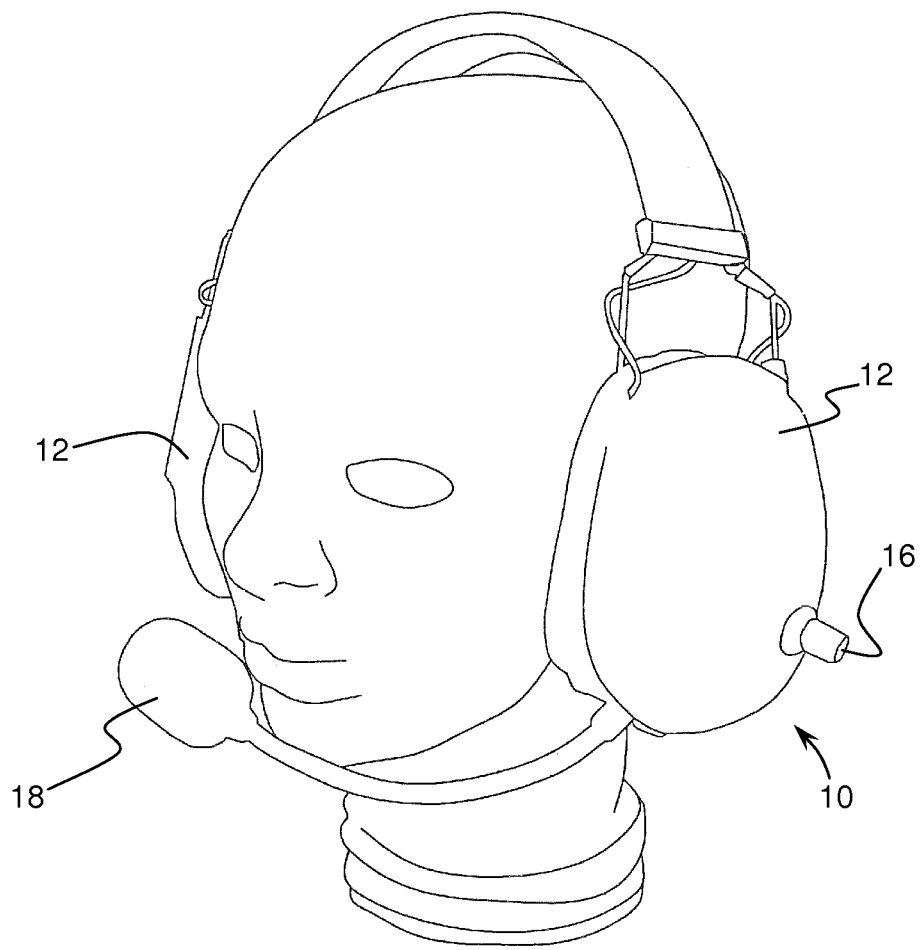
FIG. 1 is a schematic diagram of a communications headset of audio enabled control menu system and device, according to an embodiment of the present invention.

Referring now to the figures, FIG. 1 is a perspective view schematic diagram of a communications headset 10 of the audio enabled control menu system and device, according to an embodiment of the present invention. The communications headset 10 includes one or more earpiece housings 12, each of the earpiece housings including one or more speakers (not shown). The one or more speakers are an output device through which audio voice prompts are played to the operator or wearer of the headset 10. The headset further includes a knob 16 and a microphone 18. While the knob 16 is shown being located on the headset 10, the knob may also be positioned at other convenient locations, such as on a headset cord or a communications console. The components shown in FIGS. 2 and 3 used with embodiments of the present invention may be incorporated in the one or more earpiece housings 12. However, the communications headset 10 shown in FIG. 1 is an example of a communications headset that can be used. Other suitable types of headsets may be used with embodiments of the present invention.

Figure 2:
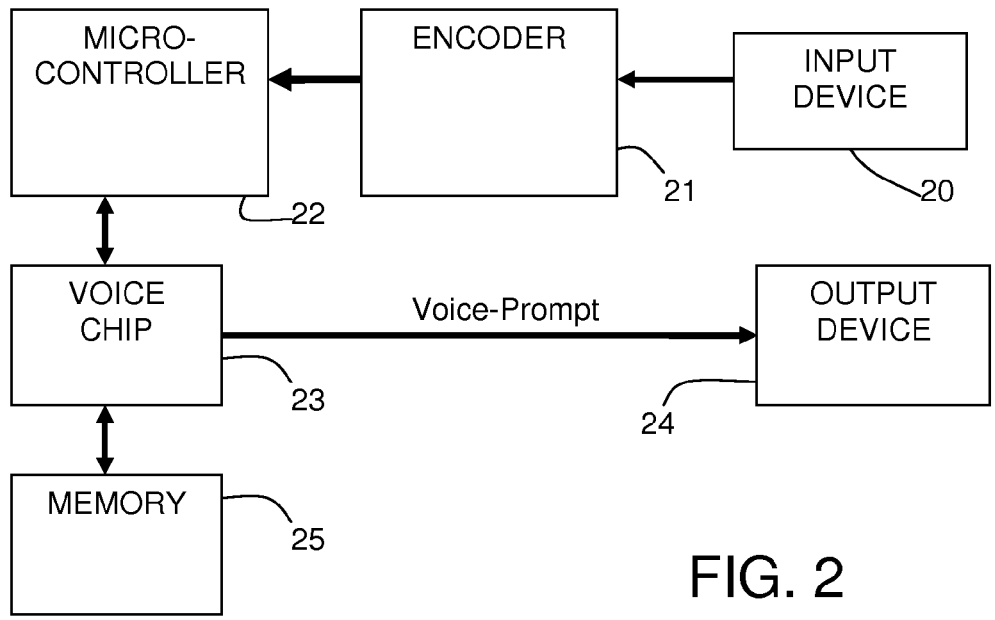
FIG. 2 is a block diagram of an auto-enabled control menu system and device, according to an embodiment of the present invention.

FIG. 2 is a block diagram of the audio enabled control menu system and device, according to an embodiment of the present invention. The voice prompt selection system and device includes an input device 20 that can be actuated to browse through the different options on a menu and select the choice on the menu. According to the embodiment, the input device 20 is a knob that can be rotated to browse through the different options and pressed inward to select the chosen option on the menu. A microcontroller 22, a voice chip 23 having multiple pre-recorded voice segments, and an output device 24 are also included. Multiple pre-recorded voice segments may also be stored in memory 25 that is in operable communication with the voice chip 23. According to one embodiment, a menu structure may be built into the microcontroller 22. The menu structure may also be stored in the memory 25. The input device 20 may be connected to the controller 22 by an encoder 21. The controller 22 is connected to the voice chip 23, and the output device 24 is connected to the voice chip 23. Using embodiments of the invention, control selections can be made using the input device 20 and the encoder 21 without needing to look at a visually presented menu of options.

According to one embodiment, the input device 20 is a knob 20 connected to a rotary encoder 21 such that rotation of the knob 20 rotates a shaft of the rotary encoder 21. The rotary encoder 21 may be a mechanical type or optical type rotary encoder, or any other type of suitable rotary encoder. According to one embodiment, the rotary encoder 21 outputs a quadrature phase shift signal in response to clockwise or counterclockwise rotation of the knob 20. The rotation of the knob 20 performs a browse function, such that the operator may browse through the different menu options available at any given part of the menu. The knob 20 may be pressed axially inward toward the earpiece housing 12 to make menu selection. The axial pressing of the knob 20 performs a select function.

According to another embodiment, the encoder 21 is a switch and the input device 20 is a switch actuator connected to the switch and configured to actuate the switch. For example, instead of rotation, the switch actuator may be moved up and down to browse through the menu options. The select function may be made my moving the switch actuator in another direction, such as inward or left or right, or moved multiple times in a direction.

According to one embodiment, the voice chip 23 includes the memory 25 for storing pre-recorded voice segments. The voice chip 23 may be configured to play the pre-recorded voice segments. Any other types of suitable audio chips or sound modules may also be used. The memory 25 can be a suitable memory for storing the pre-recorded voice segments and other executable instructions, such as ROM, RAM, or flash memory. The output device 24 may be any type of device configured to output sound, such as a speaker or an earphone.

In use with the embodiment having the rotary encoder 21 and the knob 20, the operator of the system and device turns the knob 21 with one hand either clockwise or counterclockwise, and the rotary encoder 21 transmits a position signal to the microcontroller 22 in the form of digital signal. According to the signals received from the rotary encoder 21, the microcontroller 22 controls the voice chip 23 to output a corresponding pre-recorded voice segment through the output device 24 to be heard by the operator. If a specific menu option of a menu is to be selected, the operator can press the knob 21, which transmits a selection signal of the chosen menu option to the micro-controller 22 in the form of a digital or analog signal. The micro controller 22 then initiates an action corresponding to that menu option that was selected by the operator. The system and device main power can also be controlled by pressing the knob 20. The system and device operates similarly with other types of encoders 21 and input devices 20.

The system and device menu options can be organized in a multi-level, hierarchical data structure, which is controlled by the micro controller 22. According to one embodiment, the data structure is configured as a decision tree. One example data structure is illustrated and described with reference to FIG. 5.

The combination of the microcontroller 22, the rotary encoder 21, the voice chip 23 and the memory 25 allows an operator to make menu selections using only one hand to navigate the audio voice prompt menu, turn the device on and off, and select menu options.

According to one embodiment, the menu selection process is monitored and controlled by the microcontroller 22. The pre-recorded voice segments can be in English or any other language. According to one embodiment, the length of time the knob 20 is pressed inward can be monitored by the microcontroller 22, and different lengths of time may correspond to different functions. For example, pressing and holding the knob 20 inwards for two seconds continuously can turn the system on. Therefore, a short press cannot turn on the system, thereby avoiding an accidental power-on of the system. After hearing a voice prompt when navigating through the menus, a short press of the knob inward will register a selection of that menu option that was described in the voice prompt. A longer press of the knob 20 can perform a different function, such as, for example, an adjustment of the volume of the voice prompts.

According to another embodiment of the invention, the number of times the knob 20 is quickly pressed can also have different functions. For example, when hearing the voice prompt "one, the station call", one short-press is registered as a selection of that option: calling the ground station. However, a long-press of the knob may allow the operator to adjust the volume of the voice prompt, which is a "volume" function. Two short presses may cancel the last selection and return the operator to the previous menu level, which is a "back" function, and three short presses may return the operator to the main menu level, which is a "return to main menu" function.

Embodiments of the present invention may also have an auto-power-off function when the knob or the system has not been used for three consecutive minutes, or five minutes, or any amount of time set by the user, so that they system shuts down automatically in order to save power.

One example use of the voice prompt menu selection system is described below. The operator presses the knob of the rotary encoder 6 to power-on the system. When powered on, a pre-recorded audio segment is out saying, for example, "welcome to the voice prompt menu, please continue". If the operator rotates the knob in a first direction to reach a first option of the main menu, a pre-recorded audio segment saying "voice Administrator" is output. The operator can continue rotating the knob to a second option of the main menu, and a pre-recorded voice segment saying "calling mode" is output, and to a third option of the menu where a pre-recorded voice segment "weather message" is output. The operator may rotate the knob in a second, opposite direction to return to the other main menu options. At any of the menu options, the operator may press the knob inward toward the headset to select that menu option and enter a submenu of that particular menu option.

After entering the submenu in the "calling mode" menu, the system will output "one, the station call", if the operator presses the knob vertically, then the operator can call the ground station. If he continues to rotate the knob clockwise, the system will output "two, passenger call". If the operator rotates the knob again, the system will output "three, air traffic control call". When the operator is finished talking with the ground station, the operator can press the knob vertically twice and the system returns one level to top level menu option of "calling mode", and the system will output "calling mode".

The operator can rotate the knob in either the clockwise or counterclockwise directions to return to the first position of the main menu, at which point the system will output a "welcome to the voice prompt menu, please continue" voice prompt. In one embodiment, if the operator presses the knob again, the device will power off.

Figure 3:
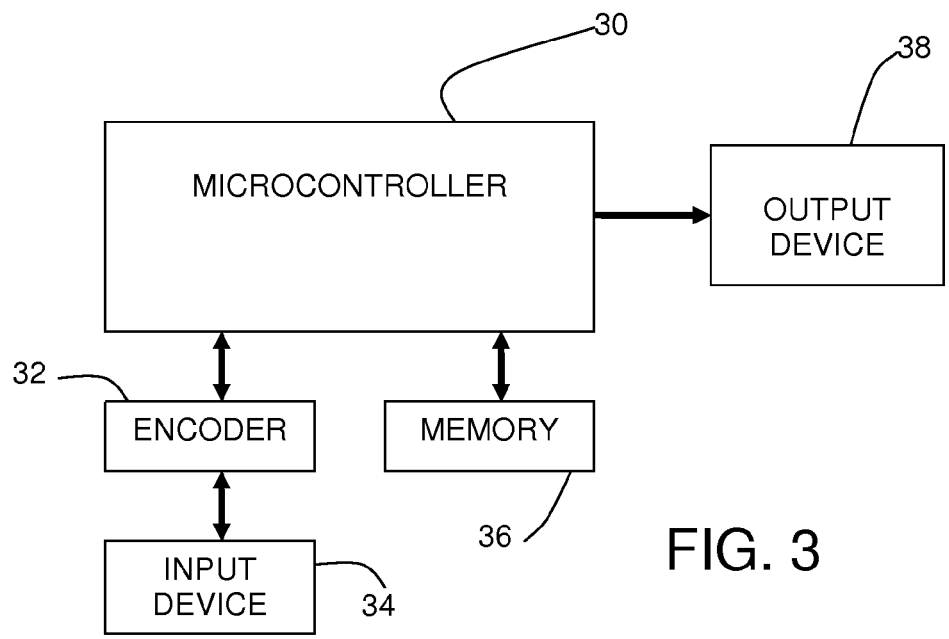
FIG. 3 is a block diagram of the audio enabled control menu system and device, according to another embodiment of the present invention.

FIG. 3 is a block diagram of the audio enabled control menu system and device, according to another embodiment of the present invention. The voice prompt selection system and device includes a microcontroller 30, an encoder 32 in operable communication with the microcontroller 30, an input device 34 coupled to the encoder 32, the input device 34 configured to actuate the encoder 32, memory 36 in operable communication with the microcontroller 30, and an output device 38 in operable communication with the microcontroller 30. The memory 36 may include a plurality of voice segments stored in a format retrievable by the microcontroller 30. The memory 36 may further include one or more instructions executable by the microcontroller 30. According to one embodiment, the one or more instructions are specifically configured to perform steps of the system and device, including, but not limited to, those illustrated and described in FIG. 4. According to one embodiment, the microcontroller 30 is configured to retrieve the voice segments from the memory 36 and output the voice segments in an audible format to the output device 38. The microcontroller 30 may further include a sound module to convert the voice segments stored in the memory 36 into audible sounds output to the output device 38.

Figure 4:
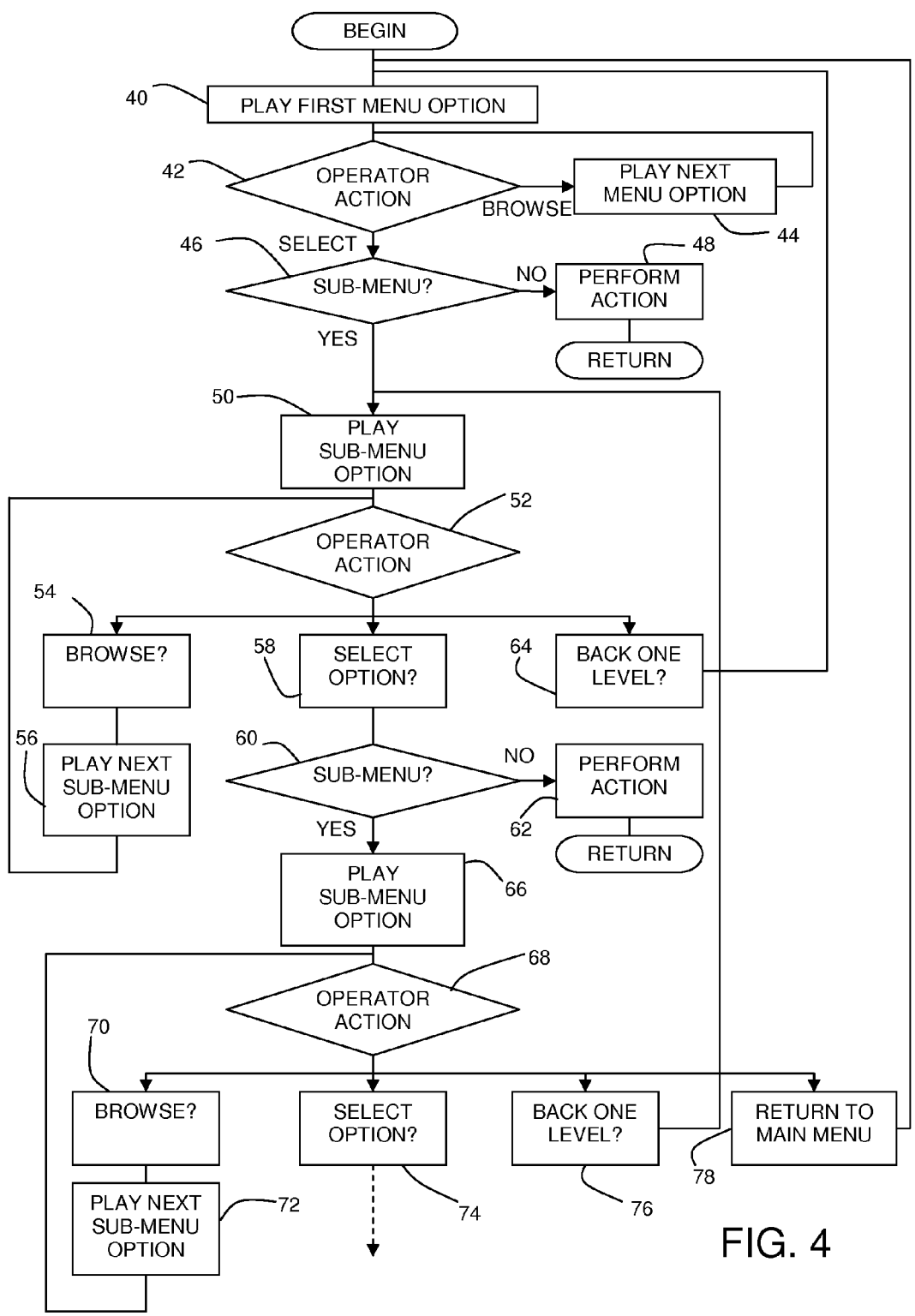
FIG. 4 is a flowchart diagram illustrating an example operation of the audio enabled control menu system and device, according to an embodiment of the present invention.

FIG. 4 is a flowchart diagram illustrating an example operation of the audio enabled control menu system and device, according to an embodiment of the present invention. The flowchart diagram illustrates a general method for navigating the menu of the system and device. While example menu options are described above, the system may use any desired voice prompts according to the particular application of the system and device. In step 40, the system outputs the first menu option. This may occur when the system is first powered on. Step 40 may also occur if the operator returns to the main menu. In step 42, the system receives an operator action, such as either a select or a browse. If the operator rotates the knob to browse the menu options, the system will output the next menu option available at the main level, step 44. The system will then return to step 42 to receive an operator action. If the operator selects the previously output menu option, the system checks if there is a submenu, step 46. If no, then the system performs the action associated with the previously output menu option, step 48. In one embodiment, the first menu option may be a welcome message and may not be actionable. Therefore, the operator will need to first browse the main menu options before making a selection.

If there is a submenu, the system outputs the submenu option, step 50. In step 52, the system receives an operator action, such as either a select or a browse. If the operator rotates the knob to browse the menu options, step 54, the system will output the next menu option available at the main level, step 56. The system will then return to step 42 to receive an operator action. If the operator selects the previously output menu option, step 58, the system checks if there is a submenu, step 60. If no, then the system performs the action associated with the previously output menu option, step 62. If the operator performs the back function, step 64, the system will return the operator to the previous level in the menu structure, which in the illustrated example is to step 40.

If there is a submenu, the system outputs the submenu option, step 66. Following that, step 68, step 70, step 72, step 74, and step 76 are similar to step 52, step 54, step 56, step 58, and step 64, respectively. The dashed line extending from step 74 illustrates that the process may continue any number of times so that the operator may navigate through all of the options in the menu and through any number of levels in the menu structure. Therefore, the operation of the system can continue similarly through any desired number of levels in any predetermined menu structure.

In step 78, the operator may perform the "return to main menu" function, and the system will return to the main menu level. According to one embodiment, the "return to main menu" function can be used by the operator at any given time during operation of the system.

Figure 5:
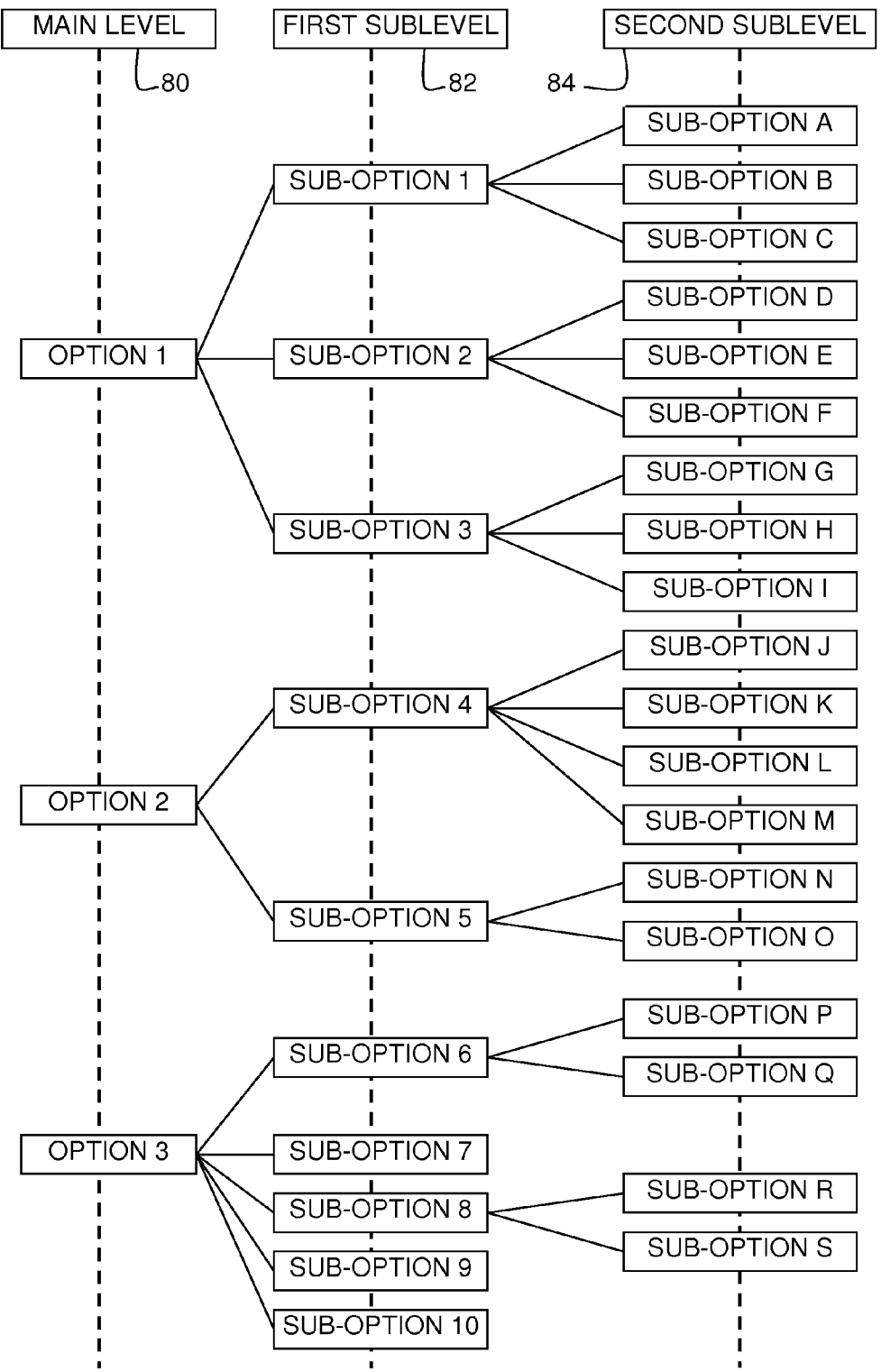
FIG. 5 is a block diagram an example menu structure of the audio enabled control menu system and device, according to an embodiment of the present invention.

FIG. 5 is a block diagram of a menu structure of a partial voice prompt menu, according to an embodiment of the present invention. The structure is a multi-level decision tree including a main level 80, a first sublevel 82, and a second sublevel 84. While three levels are shown, the menu structure may have any number of levels as required by the specific application. The main level includes option 1, option 2, and option 3. The operator may rotate the knob to browse through the options in either direction on the main level. According to one embodiment, the menus are circular such that rotation past option 3 arrives at option 1, and similarly rotation past option 1 arrives at option 3. However, the menus may also be linear such that the operator selects back and forth between the first and last options, or option 1 and option 3 in the main menu.

For example, the operator may select option 1 and arrive at the first sublevel, where the operator may browse through sub-option 1, sub-option 2, and sub-option 3. For example, the operator may select sub-option 1 and arrive at the second sublevel, where the operator may browse through sub-option A, sub-option B, and sub-option C. Similarly, the operator may navigate back and forth through the different levels, and then browse through the options available at that section of the decision tree, using the rotation of the knob and the select and buck functions of the knob as described with reference to FIGS. 1 to 4.

Embodiments of the present invention are intended to provide a system and device using single rotary knob and audio voice prompt menus to make control selections. The system and device is especially useful for those people who have to use only one hand and are unable to look at a visible menu to make a selection either because the operator must maintain visual focus on a different area, such as outside an airplane, or the user's vision is impaired.

Embodiments of the present invention can have multiple applications such as, for example, machine operation, driving motor vehicles, and flying aircraft. Embodiments of the invention can also be used to allow the blind to make menu selections, for example, when the system and device is incorporated with a personal computer or other electrical device.

According to one embodiment, the headset 10 is in operable communication with a communications system of a vehicle or aircraft or other device, such as by a wired or wireless connection. For example, a headset may be connected to the communications system of an airplane. The communications system of the airplane is further in operable communication with other communications systems, such as by radio or satellite communication to the air traffic control or ground control of an airport. The menu selections made by the operator of embodiments of the system and device may be converted in to control signals that are transmitted to a predetermined communication system enabling the function selection by the operator, depending on the particular application. While certain menu options are illustrated and described, other options and control functions may be performed using embodiments of the present invention. For example, a radio frequency, or the individual numbers of a radio frequency may be selected and transmitted to a communications radio on an aircraft or other vehicle. Also, the individual numbers of a transponder may be selected using embodiments of the present invention.

While the embodiments of the present invention may be implemented as executable instructions stored on the memory, the functions and operations required for implementing embodiments of the invention may also be embodied in whole or in part using hardware components, such as application specific integrated circuits or other suitable hardware, or some combination of hardware components and computer executable instructions.

While the invention has been particularly shown and described with reference to the illustrated embodiments, those skilled in the art will understand that changes in form and detail may be made without departing from the spirit and scope of the invention. For example, while specific types of rotary encoders have been described, other types of rotary encoders or other types of encoders may also be used. While some of the electrical components of the system and device are illustrated and described as separate components, the different components may also be further separated or combined into one or more components or electrical devices. Also, certain knob actions have been described as performing specific functions. It is to be understood that these are example actions and that embodiments of the present invention may be configured such that the different knob actions are associated with the desired function performed by the microcontroller. Additionally, while a single knob and a single encoder are illustrated and described, embodiments of the present invention may include two or more knobs, each of the two or more knobs associated with an encoder such that two or more different options may be selected quickly without needing to navigate back and forth through the menus. Each knob and associated encoder may also be configured to control a separate menu.

Accordingly, the above description is intended to provide example embodiments of the present invention, and the scope of the present invention is not to be limited by the specific examples provided.

What is claimed is:

1. A communication headset with audio enabled control menu selection, said communications headset comprising:
   at least one headset earpiece;
   an encoder disposed within said headset earpiece;
   an input device extended outwardly from said headset earpiece and configured to at least pivot about orthogonal axes; wherein said input device is coupled with said encoder to actuate said encoder to generate a menu navigation input;
   a memory disposed within said headset earpiece, wherein said memory is encoded with a menu structure comprising a plurality of menu options and a plurality of audio segments associated with the name of said menu options; and
   a microcontroller disposed within said headset earpiece; wherein said microcontroller is configured to communicate with said encoder to receive said menu navigation input;
   wherein said memory is in communication with said microcontroller, said memory further encoded with computer-readable instructions for causing said microcontroller to execute the step of causing an output device to output one of said audio segments in response to said menu navigation input.

2. The communication headset of claim 1, wherein said output device comprises at least one speaker disposed within said headset earpiece and in communication with said microcontroller, wherein said speakers are configured to output said audio segments.

3. The communication headset of claim 1, wherein said menu options are associated with predetermined control actions, and wherein said memory further encoded with computer-readable instructions for causing said microcontroller to execute the step of executing said associated control actions in response to said menu navigation input.

4. The communication headset of claim 1, wherein said menu structure is a predetermined decision tree having plurality of nodes, wherein each of said node is associated with at least one of said audio segments.

5. The communication headset of claim 1, wherein said input device is further configured to rotate and translate along the longitudinal axis of said input device.

6. The communication headset of claim 5, wherein said menu navigation input comprises a select input and a browse input; wherein said rotational and translational movement of said input device triggers said browse input and said select input respectively.

7. The communication headset of claim 5, wherein said menu navigation input includes a select input, a browse input and a back input; wherein the horizontal or rotational movement of said input device triggers said browse input while the vertical movement of said input device triggers said back input; wherein the translational movement of said input device triggers said select input.

8. The communication headset of claim 5, wherein said memory is further encoded with a plurality of voice prompt.

* * * * *